United States Patent
Lyons

(10) Patent No.: US 6,797,768 B2
(45) Date of Patent: Sep. 28, 2004

(54) WATER SWELLABLE COMPOSITIONS

(75) Inventor: Ian Russell Lyons, Keighley (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 10/276,843

(22) PCT Filed: May 25, 2001

(86) PCT No.: PCT/EP01/05994

§ 371 (c)(1),
(2), (4) Date: Nov. 19, 2002

(87) PCT Pub. No.: WO01/94433

PCT Pub. Date: Dec. 13, 2001

(65) Prior Publication Data

US 2003/0176518 A1 Sep. 18, 2003

(30) Foreign Application Priority Data

Jun. 7, 2000 (GB) .............................. 0013839

(51) Int. Cl.⁷ .............................. C08L 33/06
(52) U.S. Cl. .................. 524/561; 524/558; 524/559; 526/303.1; 526/320; 526/321; 526/328.5
(58) Field of Search ................. 524/558, 559, 524/561; 526/303.1, 320, 321, 328.5

(56) References Cited

U.S. PATENT DOCUMENTS

| | | | |
|---|---|---|---|
| 3,649,337 A | 3/1972 | Johnson et al. | 117/93.31 |
| 4,167,464 A | 9/1979 | George | 204/159.23 |
| 4,343,919 A | 8/1982 | Tefertiller et al. | 525/278 |
| 4,396,377 A | 8/1983 | Roemer et al. | 433/199 |
| 4,396,476 A | 8/1983 | Roemer et al. | 204/159.16 |
| 4,486,489 A | 12/1984 | George | 428/220 |
| 4,518,472 A * | 5/1985 | Kishida et al. | 522/110 |
| 4,600,751 A | 7/1986 | Lee et al. | 525/404 |
| 4,942,001 A | 7/1990 | Murphy et al. | 264/22 |
| 5,886,101 A | 3/1999 | Sommerfeld et al. | 525/112 |
| 5,985,952 A | 11/1999 | Levy | 522/102 |
| 6,042,943 A | 3/2000 | Levy | 428/378 |
| 6,048,587 A | 4/2000 | Estrin | 427/496 |

FOREIGN PATENT DOCUMENTS

| | | |
|---|---|---|
| WO | 88/00097 | 1/1988 |
| WO | 96/37901 | 11/1996 |
| WO | 00/57433 | 9/2000 |
| WO | WO 01/95346 A1 * | 12/2001 |

OTHER PUBLICATIONS

US 2003/0178222 A1.*

* cited by examiner

Primary Examiner—Helen L. Pezzuto
(74) Attorney, Agent, or Firm—Kevin T. Mansfield

(57) ABSTRACT

A pourable liquid composition which is radiation curable comprising an ethylenically unsaturated polymer having radiation polymerisable functionality dissolved in a monomer and is water swellable upon radiation curing.

26 Claims, No Drawings

WATER SWELLABLE COMPOSITIONS

This invention relates to pourable liquid compositions which are radiation curable comprising an ethylenically unsaturated polymer having radiation polymerisable functionality dissolved in a monomer, the compositions being water swellable upon radiation curing.

Many types of water absorbent or water swellable polymers are known (J. Macromol. Sci. Rev. Macromol. Chem. Phys. C34(4) 1994 pp 607–662).

Commercial 'superabsorbent polymers' are available and they have the ability to absorb water or aqueous salt solutions, often in an amount several times their own weight. They are commonly supplied as powders, or as fibres or films. The most common form is powders which are usually incompressible and infusible and so are not ideally suited to application as a direct coating.

Films or fibres may also be prepared in-situ via common coating or spinning techniques which usually involve polymerising hydrophilic monomers in solvents such as water. Similarly they can be applied as coatings to fabrics or other articles by many of the usual water or solvent based coating techniques.

When such coatings or films are prepared insitu, thermal reaction and/or drying, or removal of water (or other solvent), is required prior to use of such coatings. In addition they are usually very thin. This makes such known technologies unsuitable for producing a coating which is immediately functional via a rapid low cost continuous process and also unsuitable for producing relatively thick coatings which can exhibit greater swelling behaviour.

U.S. Pat. No. 4,167,464 and U.S. Pat. No. 4,486,489 describe the use of photopolymerisation methods to prepare water absorbent films or fibres from aqueous formulations comprising pre-formed acrylic acid salts as the main component. Since large amounts of water are present in the formulations the speed of the acrylate polymerisation is reduced and this can leave films which are very soft and/or which have a high level of residual tack if the systems are under-cured or not dried by insufficient exposure to the radiation and/or post heating. Indeed there may be relatively higher residual unreacted monomers if not fully cured. In addition such films, after cure, contain relatively high residual water which can be regarded as undesirable per se eg in cables. It can also contribute to a high degree of residual tack and to films being too soft. If drier films are needed from the above formulations, additional heating (drying) is stated as being necessary and this is an obvious inconvenience. The use of high water contents in the formulation can also impair the ability to coat or adhere to some substrates.

It would be desirable to formulate a pourable compisition containing no water, or a small amount of water, which is capable of forming a water swellable coating.

The invention provides pourable liquid compositions which are radiation curable comprising an ethylenically unsaturated polymer having radiation polymerisable functionality dissolved in a monomer, the compositions being water swellable upon radiation curing.

The components of the composition may be used within a wide range of relative proportions and comprise:
  an ethylenically unsaturated polymer having radiation polymerisable functionality;
  a monomer in which the polymer is dissolved.

The composition may additionally comprise:
  one or more photoinitiators and/or photosensitisers;
  an organic acid.

The composition may further comprise:
  a base;
  an inorganic salt;
  a small amount of water or organic solvent;
  a blowing or foaming agent;
  a surfactant or dispersant;
  adhesion promoter or tackifying resin;
  a fibre or filler:
  a crosslinking agent.

Other possible additives include coupling agents, air release agents, inhibitors, wetting agents, lubricants or waxes, stabilisers, antioxidants and pigments.

The final compositions of desirable formulations will depend on a number of factors including the required processing speed, coating thickness, water swelling or blocking response in terms of speed and extent, the nature of the surfaces to which the coating is to be applied, and the nature of solutions in which it is required to function (ie absorb).

The radiation polymerisable polymer, which may be referred to as a prepolymer, as in a polymer which contains ethylenic unsaturation such that it can be further polymerised, may be formed in two stages. Firstly, a monomer or monomers selected from groups below may be polymerised to form a polymer backbone, then secondly unsaturated functionalities are introduced into the polymer backbone. This unsaturated functionality provides the prepolymer with the radiation polymerisable functionality.

The polymer backbone may be formed from monomer or monomers selected from groups consisting of:

$C_1$ to $C_{20}$ alkyl (meth)acrylates, preferably $C_1$ to $C_5$ alkyl (meth)acrylates, eg methyl methacrylate;

(meth)acrylates having mono- or multi-carboxylic acid or sulphonic acid functionality eg acrylic acid or anhydride, ss-carboxy ethyl acrylate (ss-CEA), maleic acid, fumaric acid or itaconic acid (or anhydrides thereof;

salts of the acid functional (meth)acrylates with sodium, potassium, ammonium as the counter-ion eg sodium acrylate, ammonium acrylate, sodium 2-sulphoethoxy acrylate. Salts of the acid functional acrylates with other bases including organic bases such as amines eg triethylamine, methyl morpholine, hydroxyethyldiethylamine, triethanolamine, hydroxyethyl morpholine, tris(dimethylaminomethyl) phenol;

(meth)acrylates having a hydroxy functional group eg. hydroxy ethyl acrylate (HEA), hydroxy ethyl (meth) acrylate (HEMA), hydroxy propyl acrylate (HPA); acrylated epoxides eg glycidyl (meth)acrylate, acrylated amino alcohols and alkoxylated amines such as those which may be prepared in-situ by simple mixing of, for example, acid functional acrylate and a hydroxyl functional primary amine;

acrylamide and its derivatives eg N-hydroxymethylacrylamide, N-tris(hydroxymethyl) methyl acrylamide, other N-alkyl or N-alkoxy substituted acrylamides eg N,N-dimethyl acrylamide and acrylamide derivatives such as acrylamidosulphonic acid and its salts;

ether and polyether (meth)acrylates such as monoacrylates having alkoxylated chains eg ethoxy or poly ethylene oxide structure e.g. polyethylene glycol monoacrylates, preferably methoxy polyethyleneglycol 350 methacrylate, polypropylene glycol monoacrylates (egSR 607 from Sartomer Co), ethoxy ethoxyethyl acrylate (EOEOEA), ethyltriethylene glycol methacrylate, ethoxylated phenoxy ethyl acrylate, monomethoxy neopentyl glycol propoxylate monoacrylate (Photomer 8127 from Henkel);

amino-(meth)acrylates or amine-(meth)acrylate salts, eg N,N-dimethylaminoethyl acrylate (DMAEA), tertiary-butylaminoethyl methacrylate; hydrochloride or toluene sulphonate or other salt of DMAEA;

unsaturated acid chlorides, preferably (meth)acryloyl chloride.

Preferred polymer backbones, i.e. the prepolymer as it exists before the introduction of unsaturated functionalities, are formed from monomers selected from groups consisting of:

$C_1$ to $C_{20}$ alkyl (meth)acrylates, preferably $C_1$ to $C_5$ alkyl (meth)acrylates, eg methyl methacrylate;

(meth)acrylates having mono- or multi-carboxylic acid or sulphonic acid functionality eg acrylic acid or anhydride, ss-carboxy ethyl acrylate (ss-CEA), maleic acid, fumaric acid or itaconic acid (or anhydrides thereof);

(meth)acrylates having a hydroxy functional group eg. hydroxy ethyl acrylate (HEA), hydroxy ethyl (meth) acrylate (HEMA), hydroxy propyl acrylate (HPA); acrylated epoxides eg glycidyl (meth)acrylate, acrylated amino alcohols and alkoxylated amines such as those which may be prepared in-situ by simple mixing of, for example, acid functional acrylate and a hydroxyl functional primary amine;

acrylamide and its derivatives eg N-hydroxymethylacrylamide, N-tris(hydroxymethyl) methyl acrylamide, other N-alkyl or N-alkoxy substituted acrylamides eg N,N-dimethyl acrylamide and acrylamide derivatives such as acrylamidosulphonic acid and its salts;

ether and polyether (meth)acrylates such as monoacrylates having alkoxylated chains eg ethoxy or poly ethylene oxide structure e.g. polyethylene glycol monoacrylates, preferably methoxy polyethyleneglycol 350 methacrylate, polypropylene glycol monoacrylates (egSR 607 from Sartomer Co), ethoxy ethoxyethyl acrylate (EOEOEA), ethyltriethylene glycol methacrylate, ethoxylated phenoxy ethyl acrylate, monomethoxy neopentyl glycol propoxylate monoacrylate (Photomer 8127 from Henkel);

amino-(meth)acrylates or amine-(meth)acrylate salts, eg N,N-dimethylaminoethyl acrylate (DMAEA), tertiary-butylaminoethyl methacrylate; hydrochloride or toluene sulphonate or other salt of DMAEA;

unsaturated acid chlorides, preferably (meth)acryloyl chloride.

Polymer backbones of particular interest are copolymers comprising:

50 to 90 mole % of N,N-dimethylacrylamide, dimethylaminoethyl methacrylate or methyl acrylate;
10 to 50 mole % of tertiary-butylaminoethyl methacrylate, maleic anhydride, methyl acrylate or N,N-dimethylacrylamide.

Other polymer backbones of particular interest are terpolymers comprising:

90 to 95 mole % of N,N-dimethylacrylamide;
0.01 to 5 mole % of maleic anhydride;
0.01 to 5 mole % of methyl acrylate, ethyltriethylene glycol methacrylate or methoxy polyethyleneglycol 350 methacrylate.

The most preferred polymer backbone comprises:

50 mole % of N,N-dimethylacrylamide;
50 mole % of tertiary-butylaminoethyl.

The method of introduction of the unsaturated functionality's into the polymer backbone may include various known methods, which include:

i) Reaction of groups containing reactive hydrogen atoms, such as those attached to oxygen, nitrogen or sulfur, found on the polymer backbone with an unsaturated acid chloride compound. The unsaturated acid chloride is preferably (meth)acryloyl chloride. For example acryloyl chloride may react with an amine group of the polymer backbone, in order to introduce an unsaturated amide functionality into the polymer backbone.

An alternative method involves the acid chloride monomer being copolymerised into the polymer backbone. The backbone is then reacted with an unsaturated monomer which contains a reactive hydrogen atom, such as those attached to oxygen, nitrogen or sulfur. The unsaturated monomer may be a (meth)acrylate having mono- or multi-hydroxy functional group(s), an amino-(meth)acrylate or an amine-(meth)acrylate salt. The unsaturated monomer is preferably selected from hydroxy ethyl methacrylate or tertiary-butylamino ethyl (meth)acrylate. For example acryloyl chloride may be a monomer on the polymer backbone, which is then reacted with a (meth)acrylate having mono- or multi-hydroxy functional group(s), such as 2-hydroxyethyl methacrylate, in order to introduce an unsaturated ester functionality into the polymer backbone.

A preferred method of introducing the unsaturated functionality is to functionalise a polymer backbone which comprises a tertiary-butylaminoethyl methacrylate unit using acryloyl chloride.

ii) Reaction of groups containing reactive hydrogen atoms, such as those attached to oxygen, nitrogen or sulfur, found on the polymer backbone with a monomeric anhydride compound. The monomeric anhydride may be an acrylic anhydride, preferably maleic anhydride or itaconic anhydride. For example maleic anhydride may react with a hydroxy group of the polymer backbone, in order to introduce an unsaturated ester functionality into the polymer backbone.

An alternative method involves the monomeric anhydride monomer being copolymerised into the polymer backbone. The monomeric anhydride is preferably an acrylic anhydride. The backbone is then reacted with an unsaturated monomer which contains a reactive hydrogen atom, such as those attached to oxygen, nitrogen or sulfur.

A preferred method of introducing the unsaturated functionality is to functionalise the polymer backbone which comprises a maleic anhydride monomer with 2-hydroxyethyl (meth)acrylate.

iii) Reaction of groups containing reactive hydrogen atoms, such as those attached to oxygen, nitrogen or sulfur, found on the polymer backbone with a monomeric epoxide compound. The monomeric epoxide may be an acrylated epoxide, preferably glycidyl methacrylate. For example glycidyl methacrylate may react with an amine group of the polymer backbone, in order to introduce an unsaturated functionality into the polymer backbone.

An alternative method involves the monomeric epoxide being copolymerised into the polymer backbone. The monomeric epoxide is preferably an acrylated epoxide. The backbone is then reacted with an unsaturated monomer which contains a reactive hydrogen atom, such as those attached to oxygen, nitrogen or sulfur. The unsaturated monomer may be may be a (meth)acrylate having mono- or multi-hydroxy functional group(s), an amino-(meth)acrylate or an amine-(meth)acrylate salt. The unsaturated monomer is preferably hydroxy ethyl methacrylate or tertiary-butylamino ethyl (meth)acrylate. For example glycidyl methacrylate may be a monomer on the polymer backbone, which is then reacted with 2-hydroxyethyl methacrylate in order to introduce an unsaturated functionality into the polymer backbone, A preferred method of introducing the unsaturated functionality is to functionalise the polymer backbone which comprises a glycidyl methacrylate monomer with 2-hydroxyethyl (meth)acrylate.

iv) The polymer backbone may undergo an esterification or transesterification reaction. Hydroxy groups on the polymer backbone may be esterified with an unsaturated acid, preferably (meth)acrylic acid.

Carboxylic acid groups on the polymer backbone may be esterified with an unsaturated hydroxyl containing monomer, preferably a (meth)acrylate having mono- or multi-hydroxy functional group(s), more preferably hydroxyethyl (meth)acrylate.

An ester group contained within the polymer backbone may undergo a tranesterification reaction with an ester. For example, a methyl acrylate monomer within the backbone may undergo reaction with a (meth)acrylate having mono- or multi-hydroxy functional group(s), preferably hydroxy ethyl acrylate.

v) The polymer backbone may contain a tertiary amine group, which is quaternised with an unsaturated chloride. A preferred unsaturated chloride is allyl chloride.

These methods of introducing the unsaturated functionality are known, and other methods exist. The preferred unsaturated functionality is a vinyl functionality.

The prepolymer may comprise from 1 to 50 unsaturated bonds, preferably the prepolymer comprises 1 to 20. More preferably the prepolymer comprises 5 to 10 unsaturated bonds.

The prepolymer may be charged, for example as a result of a quaternisation reaction to introduce an unsaturated functionality into the polymer backbone. Preferred prepolymers of the present invention are anionic or cationic, more preferred prepolymers possess a cationic charge.

However the scope of the invention is not limited to compositions comprising charged prepolymers, the prepolymer may be non-ionic. Any charge which does exist on the prepolymer may be neutralised by the inclusion of an organic acid in the composition. The organic acid may be any organic acid which is soluble in the monomer contained in the composition. Such acids include carboxylic acids and sulfonic acids. Preferred organic acids include citric acid, adipic acid and benzoic acid.

The presence of organic acid will affect the final pH of the composition, which may be any value. Preferred pH values are in the range of pH 4 to pH 12. More preferably, the pH of the composition is not lower than pH 6.

After radiation curing of the composition, any water which comes into contact with the composition will result in swelling, but the organic acid will also be ionised, thus neutralising the charged prepolymer. Any water which comes into contact before the curing of the composition will also ionise the organic acid, resulting in the neutralisation of the charged prepolymer.

The composition may comprise between 10 to 90% of the prepolymer, based on the total weight of the composition, preferably between 30 to 70% by weight and most preferably between 40 to 60% by weight.

The molecular weight of the prepolymer may range from 1000 to 500,000. Preferably the molecular weight is below 100,000, and more preferably the molecular weight ranges from 5000 to 40,000.

The monomer in which the polymer is dissolved is preferably liquid in the temperature range of 10 to 40 degrees C., most preferably liquid at room temperature. The monomer in which the polymer is dissolved may be selected from the following:

(meth)acrylates having mono- or multi-hydroxy functional group(s) eg. hydroxy ethyl acrylate (HEA), hydroxy ethyl (meth)acrylate (HEMA), hydroxy propyl acrylate (HPA), hydroxy propyl (meth)acrylate (HPMA); glycerol mono-acrylate; trimethylolpropane monoacrylate, acrylated epoxides eg glycidyl methacrylate, acrylated amino alcohols and amino polyols and alkoxylated amines for example, acid functional acrylate and a hydroxyl functional primary amine such as tris(hydoxymethyl)aminomethane;

acrylamide and its derivatives eg N-hydroxymethylacrylamide, N-tris(hydroxymethyl) methyl acrylamide, other N-alkyl or N-alkoxy substituted acrylamides eg N,N-dimethyl acrylamide and acrylamide derivatives such as acrylamidosulphonic acid and its salts;

ether and polyether (meth)acrylates such as monoacrylates having alkoxylated chains eg ethoxy or poly ethylene oxide structure e.g. polyethylene glycol monoacrylates, preferably methoxy polyethyleneglycol 350 methacrylate or methoxy polyethyleneglycol 550 methacrylate, polypropylene glycol monoacrylates, ethoxy ethoxyethyl acrylate (EOEOEA), ethyltriethylene glycol methacrylate, ethoxylated phenoxy ethyl acrylate, monomethoxy neopentyl glycol propoxylate monoacrylate (Photomer 8127 from Henkel);

unsaturated N-substituted amides, eg N-vinyl formamide, N-vinyl caprolactam, N-vinyl pyrolidone.

Preferred monomers include N,N-dimethylacrylamide, N-vinyl formamide, 2-hydroxyethyl acrylate, 2-hydroxyethyl methacrylate and ethyltriethylene glycol methacrylate. The most preferred monomer being N,N-dimethylacrylamide.

A single monomer or a blend of monomers selected from those listed above, may be used in the composition.

One or more photoinitiators may be selected from the groups below:

For free radical reaction of acrylate by UV radiation or visible light radiation:

acetophenone type e.g. 2-hydroxy-2-methyl-1-phenyl-propan-1-one (Darocur 1173 "RTM")

acyl phosphine oxide eg Irgacure 1800 "RTM";

benzoin type eg benzil dimethyl ketal (Irgacure 651 "RTM");

benzophenone type;

thioxanthone type eg isopropylthioxanthone (ITX)

other sensitiser and co-initiator for Wand visible light curing eg triethanolamine, other amine alcohols, Michler's Ketone, eosin.

Those photoinitiators recognised by the registered trade mark Darocur and the registered trade mark Irgacure are suitable for the present invention.

For cationic reaction of vinyl ether or epoxy system example photoinitiators are aryl diazonium salts or aryl sulphonium salt, and aryl metal complexes such as Ciba CG24-061 "RTM".

The composition may comprise between 0.01 and 20% by weight of photoinitiator, based on the total weight of the composition, preferably between 2 and 12% by weight.

Examples of bases that can be added include hydroxides, alkoxides, carbonates, carbamates, and hydrogen carbonates, di- and tri-basic phosphates or citrates, of ammonium and of Group I and II metals including sodium, potassium, magnesium, and calcium.

Organic bases such as amines eg triethanolamine or triethylamine (TEA) or morpholines (eg Nmethyimorpholine, MeM) or piperidines or tris (dimethylaminomethyl)phenol can also be used. In the absence of pre-dissolving in water or other diluent, the bases that are solid are used as powders, dispersed in the liquid components of the formulation. Bases are usually added to compositions containing acid functional acrylates.

Examples of added salts that may be used include halides, acetates, sulphates, carboxylated and phosphates of metals and ammonium or other amine/substituted ammonium counter-ions.

Examples of solvents which may be added include alcohols, glycols polyols, ethers and alkoxylated solvents. Examples include ethanol, methanol, isopropanol, ethylene glycol, propylene glycol, polyalkylene oxides, glycerol, trimethylolpropane, alkoxylated derivatives and ethers of the above (e.g. Photonols from Henkel). Levels of added solvents, if used, are preferably lower than 25% by weight of the total composition. However, the present compsositions preferably contain no solvent. Water may also be used as a solvent. However, the present compsositions preferably contain no water.

Addition of surfactant up to 40% of the total composition weight can increase swell response. Example surfactants which can be used with or without water can be non-ionic, eg alkoxylated amines, alcohols, esters, oils, fatty acids, nonylphenol and ethanolamides and sorbitan esters, alkyl aryl polyether alcohols eg Triton X100 "RTM" (from Rohm & Haas), or anionic or cationic, or amphoteric. Surfactants can help to stabilise same systems with dispersed salt or base or other undissolved solid.

Addition of a blowing agent which can generate gas when contacted with water or on heating (eg during exposure to UV lamp and/or other application source of heat) can increase the swell response in some cases. Examples are sodium bicarbonate, sodium carbonate, ammonium carbonate, ammonium bicarbonate with or without organic or inorganic acid (eg acetic acid, citric acid, oxalic acid, tartaric acid or keto-acid, or hydroxy acids such as lactic acid, etc), or NaAl(SO4)2, NaH2P04 or NaBH4; or C6N6, BaN6, azo compounds such as azodicarbonamide etc. It will be seen that some such as of those blowing agents such as carbonates, hydrogen carbonates and some phosphate derivatives may usefully act both as blowing agent and base in certain formulations.

Foamed structures can be produced by simple use of hydroxide bases such as sodium hydroxide, although the mechanism of foam formation is not clear.

Addition of fillers such as inorganic particles (eg fumed silica, mica) or polymer powders or fibres e.g. polyethylene powder may increase swelling response in certain systems.

Addition of hydrophilic fibre, water soluble fibre or hydrophilic surface treated fibre can help to increase swell response in certain formulations. Examples include ground cellulosic fibres, polyvinyl alcohol fibre.

Addition of oligomer with radiation polymerisation functionality and phosphoric acid/ester helps to increase adherability to certain substrates. Examples are phosphoric acid diacrylate, hydroxymethylmethacrylate-phosphate and styrene phosphonic acid.

The composition may further comprise a crosslinking agent, such as a low molecular weight multifunctional (meth)acrylate. Known crosslinking agents which may be used in the present composition include methylene bis acrylamide, ethylene glycol di-(meth)acrylate, di-(meth) acrylamide, cyanomethyl(meth)acrylate or vinyloxyethyl (meth)acrylate. A preferred cross linking agent is pentaerythritol triacrylate. The amounts of crosslinking agent may be in the range of 100 to 2000 ppm, preferably in the range of 200 to 1200 ppm.

The type of radiation used to cure the composition may be any suitable source of radiation such as infra-red, ultra-violet or heat radiation. A preferred form of radiation is ultra-violet.

The composition may be prepared in a multi-step process comprising the initial production of the polymer backbone, functionalisation of the polymer backbone by the addition of unsaturated bonds along the polymer backbone, isolation of this intermediate and mixing with the monomer in which the prepolymer is to be dissolved, optionally with the addition of one or more photonitiators and/or photosensitisers.

The preparation of the ethylenically unsaturated functionalised prepolymer may be carried out in any number of standard ways.

The polymer backbone may be prepared by polymerisation of the monomer or monomers, preferably in an aprotic solvent, using an appropriate initiator. Known initiators include peroxy type initiators and azo type initiators. For example, Luperox IIM75 "RTM" or tertiary-butyl perpivalate, may be used with cationic monomers and Vazo 67 "RTM" may be used with anionic monomers.

After polymerisation is complete, the polymer backbone is functionalised by introducing unsaturated groups into the polymer backbone. Functionalisation occurs via the substitution of a hydrogen on the polymer backbone, so an aprotic solvent is preferably used. Preferred solvents include ethyl acetate and butyl acetate.

A preferred method of functionalisation is the reaction of acryloyl chloride with an amine group of the polymer backbone.

Once the prepolymer has been formed, the solvent is removed by any standard method. Such a method may include the addition of an inhibitor, the application of a vacuum to the prepolymer/solvent mixture to remove the solvent, then the addition of water. Before, during or after the removal of the solvent, the organic acid may be added. Subsequently the water may be removed resulting in a liquid prepolymer, preferably all of the water is removed resulting in a solid prepolymer. The water may be removed by any standard procedure, including spray drying and the use of dry nitrogen. The solvent removal and drying steps may be combined by spray drying the prepolymer directly from the solvent.

After the drying stage, the solid prepoymer is preferably ground in order to reduce the particle size and aid the prepolymer dissolution.

The functionalised prepolymer is then dissolved in the monomer, and any photoinitiators or photosensitisers may also be added.

A further aspect of this invention is a composition comprising:
an ethylenically unsaturated polymer having radiation polymerisable functionality;
water The composition may additionally comprise:

one or more photoinitiators and/or photosensitisers;
an organic acid.

The composition may further comprise:
a base;
an inorganic salt;
a small amount of organic solvent;
a blowing or foaming agent;
a surfactant or dispersant;
adhesion promoter or tackifying resin;
a fibre or filler;
a crosslinking agent.

Other possible additives include coupling agents, air release agents, inhibitors, wetting agents, lubricants or waxes, stabilisers, antioxidants and pigments.

The final compositions of desirable formulations will depend on a number of factors including the required processing speed, coating thickness, water swelling or blocking response in terms of speed and extent, the nature of the surfaces to which the coating is to be applied, and the nature of solutions in which it is required to function (ie absorb).

The radiation polymerisable polymer and its method of preparation has been described previously. The other components have also been previously described.

The composition may comprise between 10 to 100% of the prepolymer, based on the total weight of the composition.

The preparation of the ethylenically unsaturated functionalised prepolymer may be carried out in any number of standard ways.

The polymer backbone may be prepared by polymerisation of the monomer or monomers, preferably in an aprotic solvent, using an appropriate initiator. Known initiators include peroxy type initiators and azo type initiators. For example, Luperox IIM75 "RTM" or tertiary-butyl perpivalate, may be used with cationic monomers and Vazo 67 "RTM" may be used with anionic monomers.

After polymerisation is complete, the polymer backbone is functionalised by introducing unsaturated groups into the polymer backbone. Functionalisation occurs via the substitution of a hydrogen on the polymer backbone, so an aprotic solvent is preferably used. Preferred solvents include ethyl acetate and butyl acetate.

A preferred method of functionalisation is the reaction of acryloyl chloride with an amine group of the polymer backbone.

Once the prepolymer has been formed, the solvent is removed by any standard method. Such a method may include the addition of an inhibitor, the application of a vacuum to the prepolymer/solvent mixture to remove the solvent, then the addition of water. Before, during or after the removal of the solvent, the organic acid may be added. Subsequently the water may be removed resulting in a liquid prepolymer, preferably all of the water is removed resulting in a solid prepolymer. The water may be removed by any standard procedure, including spray drying and the use of dry nitrogen. The solvent removal and drying steps may be combined by spray drying the prepolymer directly from the solvent.

After the drying stage, the solid prepoymer is preferably ground in order to reduce the particle size and aid the prepolymer dissolution.

The functionalised prepolymer is then dissolved in water, and any photoinitiators or photosensitisers may also be added.

Generally the compsitions may be applied to articles which contain water sensitive material within a more durable exterior, which is prone to fracture, rupture or developing fissures through which water can be transmitted. For example, the composition may be applied to a cable, the cable being surrounded by a plastic coating that may fracture allowing ingress of moisture.

The composition may be applicable to articles that comprise one or more of the group consisting of glass, plastic, rubber and metal. Generally the composition is of particular value when the article is a sheet, a fibre or a cable.

The composition may be used to coat fibres (eg glass fibres; yarns), wires, or rods (eg cable tension members) or tubes (eg polymeric cable jackets or buffer tubes) or other articles. The compositions can be coated and cured on cable components (wave guide, tension member, buffer tubes, wrappings, tapes etc.) at a range of thickness of 0.001 inch up to 0.2 inches.

The compositions can have a range of swell response time from in seconds to minutes after it comes into contact with water. This coating (cured composition) can swell, for example, at a range of 8 times or more over original thickness. Swell heights in excess of 60 times the original thickness are possible.

The compositions may be used as a water absorbent coating or as a gel blocking agent which will absorb water to form a gel which prevents further ingress of water.

The following examples further illustrate the present invention:

EXAMPLE 1

The Preparation of the Ethylenically Unsaturated Functionalised Prepolymer:

To a stirred reactor containing 250 g of ethyl acetate and 1.33 g tertiary-butyl perpivalate at reflux is added a monomer feed composed of 75 g N,N-dimethylacrylamide and 75 g tertiary-butylaminoethyl methacrylate over a period of two hours. An initiator feed composed of 2.66 g of tertiary-butyl perpivalate dissolved in 55 g of ethyl acetate over a period of two hours and fifteen minutes. After the additions are complete, the reactor contents are held for a further period of one hour at reflux in order to effect complete polymerisation before being cooled to 30 degrees C. Upon cooling, 3.6 g of acryloyl chloride and 0.0375 g of phenothiazine are dissolved in 120 g of ethyl acetate, this solution is then added to the stirred reactor contents over a period of 30 minutes. The contents of the reactor are then stirred for a further 30 minutes, then a vacuum is applied to remove the ethyl acetate which is then replaced, via a solvent swap, with 9.95 g of citric acid dissolved in 377.6 g of water. The product is a 30% aqueous solution of a 20,000 molecular weight copolymer, comprising about 50% N,N-dimethylacrylamide and 50% tertiary-butylaminoethyl methacrylate in the form of a citric acid salt, functionalised with an average of 5 vinyl groups per polymer chain.

EXAMPLE 2

Preparation of the Swellable Composition:

The aqueous solution from example 1 is dried under a nitrogen blanket and then ground using a pestle and mortar. The solid is then dissolved in N,N,-dimethylacrylamide to form a 30% by weight solution, based on the weight of the total formulation. The solution is then mixed with 10% by weight of the total formulation, of DARACUR 1173 "RTM".

EXAMPLE 3

Evaluation of Swell Performance:

The composition from example 2 is coated onto Melinex 542 "RTM" at a thickness of 24 microns using a K-Bar Number 3. This coated sample is then passed under a lab scale UV lamp twice, at a line speed of 10 metres per second. After this curing step, an 80 mm² circle is cut from the sample, and placed, coated side up, into a swelling cup of internal diameter 82 mm². A 80 mm² circle of chemically bonded non woven polyethylene is then placed on top of the sample. A piston is inserted into the cup, which is free to move. The swelling cup assembly is then placed into a digital micrometer, such as a MT25B Micrometer with an ND221 Digital Display unit, and the readout is set to zero. 100 cm³ of deionised water is placed into the swelling cup, and then the swell height is measured with time.

The results are shown in the following table 1:

TABLE 1

| Swell Height (microns) | Time (seconds) |
|---|---|
| 120 | 30 |
| 400 | 40 |
| 800 | 50 |
| 1200 | 60 |
| 1600 | 80 |
| 1800 | 100 |
| 1800 | 200 |
| 1800 | 300 |
| 1800 | 400 |
| 1800 | 500 |

These results shot that the present composition provides excellent swell height and swell speed.

What is claimed is:

1. A pourable liquid composition capable of being applied to a substrate as a coating, said composition being radiation curable and comprising an ethylenically unsaturated polymer having radiation polymerisable functionality dissolved in a monomer and being water swellable upon radiation curing.

2. A composition according to claim 1 which contains no water or organic solvent.

3. A composition according to claim 2 wherein the ethylenically unsaturated polymer is formed from a monomer or monomers which are polymerised to form a polymer backbone, then unsaturated functionalities are introduced into the polymer backbone to provide the radiation polymerisable functionality.

4. A composition according to claim 3 wherein the polymer backbone is formed from a monomer or monomers of the type selected from groups consisting of $C_1$ to $C_{20}$ alkyl (meth)acrylates, (meth)acrylates having mono- or multi- carboxylic acid or sulphonic acid functionality, salts of (meth) acrylates having mono- or multi- carboxylic acid or sulphonic acid functionality, (meth)acrylates having a hydroxy functional group, acrylamide, acrylamide derivatives, ether and polyether (meth) acrylates, amino-(meth)acrylates or amine-(meth)acrylate salts and unsaturated acid chlorides.

5. A composition according to claim 3 wherein the unsaturated functionality is introduced by reaction of the polymer backbone with an unsaturated acid chloride compound, an unsaturated monomer which contains a reactive hydrogen atom, a monomeric anhydride compound, a monomeric epoxide compound or an unsaturated chloride.

6. A composition according to claim 1 wherein the ethylenically unsaturated polymer contains from 1 to 50 unsaturated bonds.

7. A composition according to claim 1 wherein the ethylenically unsaturated polymer is cationic.

8. A composition according to claim 1 wherein the ethylenically unsaturated polymer is anionic or non-ionic.

9. A composition according to claim 1 wherein the ethylenically unsaturated polymer has a molecular weight in the range from 1,000 to 500,000.

10. A composition according to claim 1 which comprises 10 to 90% by weight, based on the weight of the composition of the ethylenically unsaturated polymer.

11. A composition according to claim 1 wherein the monomer in which the ethylenically unsaturated polymer is dissolved is liquid in the temperature range of 10 to 40 degrees C.

12. A composition according to claim 1 wherein the monomer in which the ethylenically unsaturated polymer is dissolved is selected from the group consisting of (meth)acrylates having mono- or multi- hydroxy functional group (s), acrylamide, acrylamide derivatives, ether and polyether (meth)acrylates and unsaturated N-substituted amides.

13. A composition according to claim 1 which also comprises one or more photoinitiators and/or photosensitisers.

14. A composition according to claim 13 which also comprises between 0.01 and 20% by weight of photoinitiator, based on the total weight of the composition.

15. A composition according to claim 1 which also comprises an organic acid.

16. A composition according to claim 1 which also comprises a crosslinking agent.

17. A method of preparing a composition according to claim 1 comprising the initial production of a polymer backbone, functionalisation of a polymer backbone by the addition of unsaturated bonds, isolation of the intermediate produced then mixing with the monomer in which the ethylenically unsaturated polymer is to be dissolved.

18. A method according to claim 17 comprising the addition of one or more photonitiators and/or photosensitisers.

19. A pourable liquid composition which is radiation curable comprising an ethylenically unsaturated polymer having radiation polymerisable functionality dissolved in water and is water swellable upon radiation curing.

20. A composition according to claim 19 wherein the ethylenically unsaturated polymer is formed from a monomer or monomers which are polymerised to form a polymer backbone, then unsaturated functionalities are introduced into the polymer backbone.

21. A composition according to claim 20 wherein the polymer backbone is formed from a monomer or monomers of the type selected from groups consisting of $C_1$ to $C_{20}$ alkyl (meth)acrylates, (meth)acrylates having mono- or multi- carboxylic acid or sulphonic acid functionality, salts of (meth) acrylates having mono- or multi- carboxylic acid or sulphonic acid functionality, (meth)acrylates having a hydroxy functional group, acrylamide, acrylamide derivatives, ether and polyether (meth) acrylates, amino-(meth)acrylates or amine-(meth)acrylate salts and unsaturated acid chlorides.

22. A composition according to claim 20 wherein the unsaturated functionality is introduced by reaction of the polymer backbone with an unsaturated acid chloride compound, an unsaturated monomer which contains a reactive hydrogen atom, a monomeric anhydride compound, a monomeric epoxide compound or an unsaturated chloride.

23. A composition according to claim 19 wherein the ethylenically unsaturated polymer contains from 1 to 50 unsaturated bonds.

24. A composition according to claim 19 which comprises 10 to 100% by weight, based on the weight of the composition of the ethylenically unsaturated polymer.

25. A method of coating the exterior of articles prone to fracture, rupture or developing fissures, through which fissures water can be transmitted comprising applying to the exterior of said articles a composition according to claim 1.

26. A polymer produced by radiation curing of a compostion as claimed in claim 1, which upon contact with water swells to prevent passage of water therethrough.

* * * * *

UNITED STATES PATENT AND TRADEMARK OFFICE
CERTIFICATE OF CORRECTION

PATENT NO. : 6,797,768 B2
DATED : September 28, 2004
INVENTOR(S) : Ian Russell Lyons et al.

It is certified that error appears in the above-identified patent and that said Letters Patent is hereby corrected as shown below:

Title page,
Item [75], Inventors, should read:
-- Ian Russel Lyons, Keighley (GB)
 Howard Roger Dungworth, Halifax (GB)
 Simon Andrew Collier, Halifax (GB) --

Signed and Sealed this

Twenty-second Day of February, 2005

JON W. DUDAS
*Director of the United States Patent and Trademark Office*